United States Patent
Tate, Jr. et al.

(10) Patent No.: US 8,626,381 B2
(45) Date of Patent: Jan. 7, 2014

(54) INCREASING VEHICLE RANGE BY MINIMIZING TRAPPED HVAC ENERGY

(75) Inventors: Edward D. Tate, Jr., Grand Blanc, MI (US); Scott E. Jackson, Northville, MI (US); Roger A. Clark, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 509 days.

(21) Appl. No.: 12/969,714

(22) Filed: Dec. 16, 2010

(65) Prior Publication Data

US 2012/0158241 A1 Jun. 21, 2012

(51) Int. Cl.
*B60H 1/00* (2006.01)

(52) U.S. Cl.
USPC ............. 701/36; 701/400; 701/408; 701/465; 701/468; 62/132; 62/133

(58) Field of Classification Search
None
See application file for complete search history.

(56) References Cited

U.S. PATENT DOCUMENTS

| | | | | |
|---|---|---|---|---|
| 6,298,911 B1 * | 10/2001 | Volz et al. | ...... | 165/202 |
| 6,487,477 B1 * | 11/2002 | Woestman et al. | ............. | 701/22 |
| 7,958,958 B2 * | 6/2011 | de la Torre Bueno | ..... | 180/65.29 |
| 2006/0142915 A1 * | 6/2006 | Isono et al. | ...................... | 701/36 |
| 2008/0262668 A1 * | 10/2008 | Yamada | ............................ | 701/22 |
| 2009/0114463 A1 * | 5/2009 | DeVault | ...................... | 180/65.29 |
| 2010/0138142 A1 * | 6/2010 | Pease | ............................ | 701/123 |
| 2010/0292893 A1 * | 11/2010 | Yamada et al. | .................. | 701/36 |
| 2010/0324765 A1 * | 12/2010 | Iida et al. | .......................... | 701/22 |
| 2011/0172880 A1 * | 7/2011 | Tamura | ............................ | 701/36 |
| 2012/0041627 A1 * | 2/2012 | Kelty et al. | ...................... | 701/22 |
| 2012/0143410 A1 * | 6/2012 | Gallagher et al. | ............... | 701/22 |
| 2012/0222438 A1 * | 9/2012 | Osaka et al. | ..................... | 62/126 |
| 2013/0066552 A1 * | 3/2013 | Hamilton et al. | ............. | 701/527 |

* cited by examiner

*Primary Examiner* — Jonathan M Dager

(57) ABSTRACT

A method of increasing a range of a vehicle by decreasing trapped HVAC energy at an end of a trip. The method may include the steps of: determining a destination list based on locations where the vehicle may be parked in the future, the destination list accessible by a control module in the vehicle; determining HVAC reduction regions around each of the locations on the destination list, the HVAC reduction regions accessible by the control module; operating a HVAC system while the vehicle is moving; tracking the location of the vehicle relative to the locations on the destination list; and the control module automatically reducing the energy usage of the HVAC system when the vehicle enters one of the HVAC reduction regions.

21 Claims, 2 Drawing Sheets

US 8,626,381 B2

INCREASING VEHICLE RANGE BY MINIMIZING TRAPPED HVAC ENERGY

BACKGROUND OF INVENTION

The present invention relates generally to controlling heating, ventilation and air conditioning (HVAC) systems for vehicles.

Many modern automotive vehicles now operate at times on battery power, either fully or partially. Since the range of a vehicle on battery power is generally much less than a conventional vehicle operated with a gasoline or diesel engine, the drain on the battery from particular vehicle systems becomes more significant. For example, in battery electric vehicles, extended range electric vehicles and some types of hybrid electric vehicles, the HVAC system can consume as much power as the average load on the traction motor on cold days. The HVAC cooling load can also be quite high on hot days. Either way, the drain on the battery from the HVAC load can significantly shorten the range the vehicle can travel on battery power. Thus, it is desirable to increase the electric driving range by decreasing the vehicle electrical loads where possible, without sacrificing occupant comfort and conveniences.

SUMMARY OF INVENTION

An embodiment contemplates a method of increasing a range of a vehicle by decreasing trapped HVAC energy at an end of a trip, the method comprising the steps of: determining a destination list based on locations where the vehicle may be parked in the future, the destination list accessible by a control module in the vehicle; determining HVAC reduction regions around each of the locations on the destination list, the HVAC reduction regions accessible by the control module; operating a HVAC system while the vehicle is moving; tracking the location of the vehicle relative to the locations on the destination list; and the control module automatically reducing the energy usage of the HVAC system when the vehicle enters one of the HVAC reduction regions.

An advantage of an embodiment is that the range of a vehicle operating on battery power can be extended by reducing power consumed by the HVAC system, while preserving thermal comfort for the vehicle occupants. Energy already in the HVAC system can be used near the end of a trip to provide heating or cooling, thus minimizing thermal energy trapped in the HVAC system when the vehicle arrives at a destination. This can also be applied to a more conventional vehicle using a gasoline or diesel engine, where the refrigerant compressor operation may be terminated before arriving at a destination. The slight decrease in HVAC performance near the end of a trip may be minimal on the vehicle occupants since the vehicle will have already been conditioned during the most of the trip. The HVAC operation can be modified with respect to programmed destinations, learned destinations or both. The destinations and vehicle location can be tracked via a navigation system, OnStar™, or other types of systems that can be employed to track the particular location of the vehicle.

DETAILED DESCRIPTION

Figure 1:
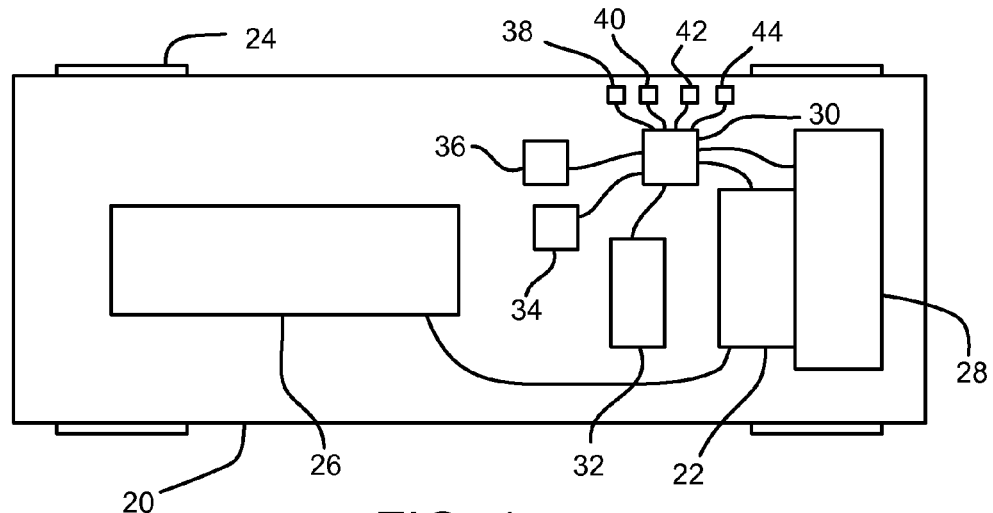
FIG. 1 is a schematic view of a portion of a vehicle.

Referring to FIG. 1, a portion of a vehicle 20 is shown schematically. The vehicle 20 may include an electric motor 22 that may provide torque to vehicle wheels 24 and be powered by a battery 26. The vehicle may also include a power plant 28 that provides torque to the vehicle wheels or charges the battery 26 or both. The power plant 28 may be, for example, an internal combustion engine or a fuel cell. Alternatively, the vehicle 20 may not include a power plant 28, or may include a power plant such as an internal combustion engine without employing a motor to provide torque to the wheels 24.

One or more control module(s) 30 may be employed to communicate with and control the various vehicle systems. The control modules may be made up of various types of electronic hardware and software as is known to those skilled in the art. The control module 30 is in communication with a heating, ventilation and air conditioning (HVAC) system 32 and can control the operation of this system 32. The control module 30 may also be in communication with a navigation system 34 and/or another type of electronic system, such as, for example, an OnStar™ system 36. Generally, the control module 30 is in communication with some type of system that can track the location of the vehicle 20. This may use, for example, Global Positioning System (GPS), cell towers and/or some other means to determine the location of the vehicle. The control module 30 may also be in communication with various sensors. Such sensors may include, for example, an odometer 38 for measuring the distance the vehicle 20 travels, an external temperature sensor 40 for measuring ambient temperature around the vehicle 20, a sun load sensor 42 for measuring the sun load on the vehicle 20, and an internal temperature sensor 44 for measuring temperature inside a passenger compartment, among others known to those skilled in the art.

Figure 2:
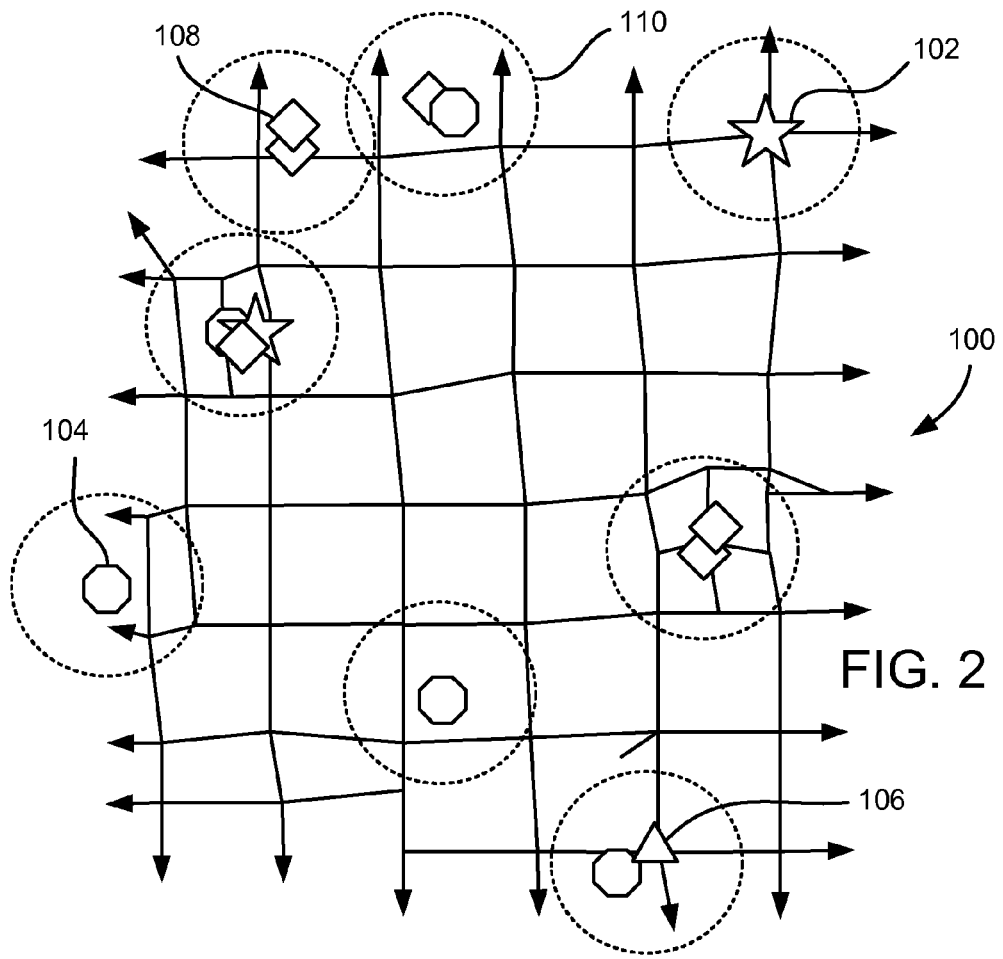
FIG. 2 is a schematic view of possible roads and points of significance relative to HVAC operation.

FIG. 2 illustrates a schematic view of a road system 100, with various roadways that one may travel in the vehicle. The control module stores the locations that may be significant relative to the HVAC control. Alternatively, the locations may be stored remotely, but with a communication system that allows the control module to access the information. For example, recent battery charging locations 102, indicated by a star shape on the map, may be sites that are stored in the control module on a destination list. Recent parking locations 104, indicated by an octagonal shape on the map, may be sites that are stored in the control module on the destination list. Rules may be set for when a vehicle stopping is considered a parking location 104. For example, the vehicle may have to be turned off for a minimum amount of time (measured in minutes or hours) for the vehicle stoppage to be considered a parking location 104. Long term parking locations 106, indicated by a triangle on the map, may be sites that are stored in the control module on the destination list. The long term parking location 106 may be set only when the vehicle has remained at that location for a long time, for example at least several days, before it is considered long term parking. In addition, programmed addresses 108, indicated by diamond shapes on the map, may be sites that are programmed onto the destination list by the vehicle operator. This allows the vehicle operator to set locations where reduced HVAC use is acceptable without having to remember to adjust the HVAC system while one is operating the vehicle. The destination list may be set up such that some sites drop off the list after a certain amount of time. That way sites that are not visited regularly (or ever again) may be eliminated from the list, leaving the most relevant on the list. Although, programmed addresses may stay on the list, while only learned destinations are those that drop off the list.

The dashed, generally circular regions 110 in FIG. 2 are regions for reduced HVAC use. That is, when the vehicle enters in these regions 110, the energy used for heating (or air conditioning) is substantially reduced or eliminated (under certain circumstances). The diameter of the circle for these regions 110 may be a predetermined distance—for example, a radius of about three kilometers. In addition, the predetermined distance may be varied based on various factors related to the climate around and in the vehicle. For example, if the air conditioning is running and the ambient temperature is quite high and/or the sun load is quite high, then the predetermined distance may be reduced since the vehicle interior will heat up much more rapidly. Of course, if the opposite is true, then the predetermined distance may be increased in order to achieve even greater energy savings. In addition, the difference between the actual passenger compartment temperature and the temperature requested by the vehicle occupants (the set point), may be a factor in adjusting the predetermined distance for the particular HVAC reduction region 110. Rather than adjusting the predetermined distance, or in addition to this, the amount of reduction in the HVAC operation may be adjusted to account for the different ambient conditions. In addition, the HVAC reduction region size may be based on expected travel time to the location rather than distance from the location.

Figures 3, 4:
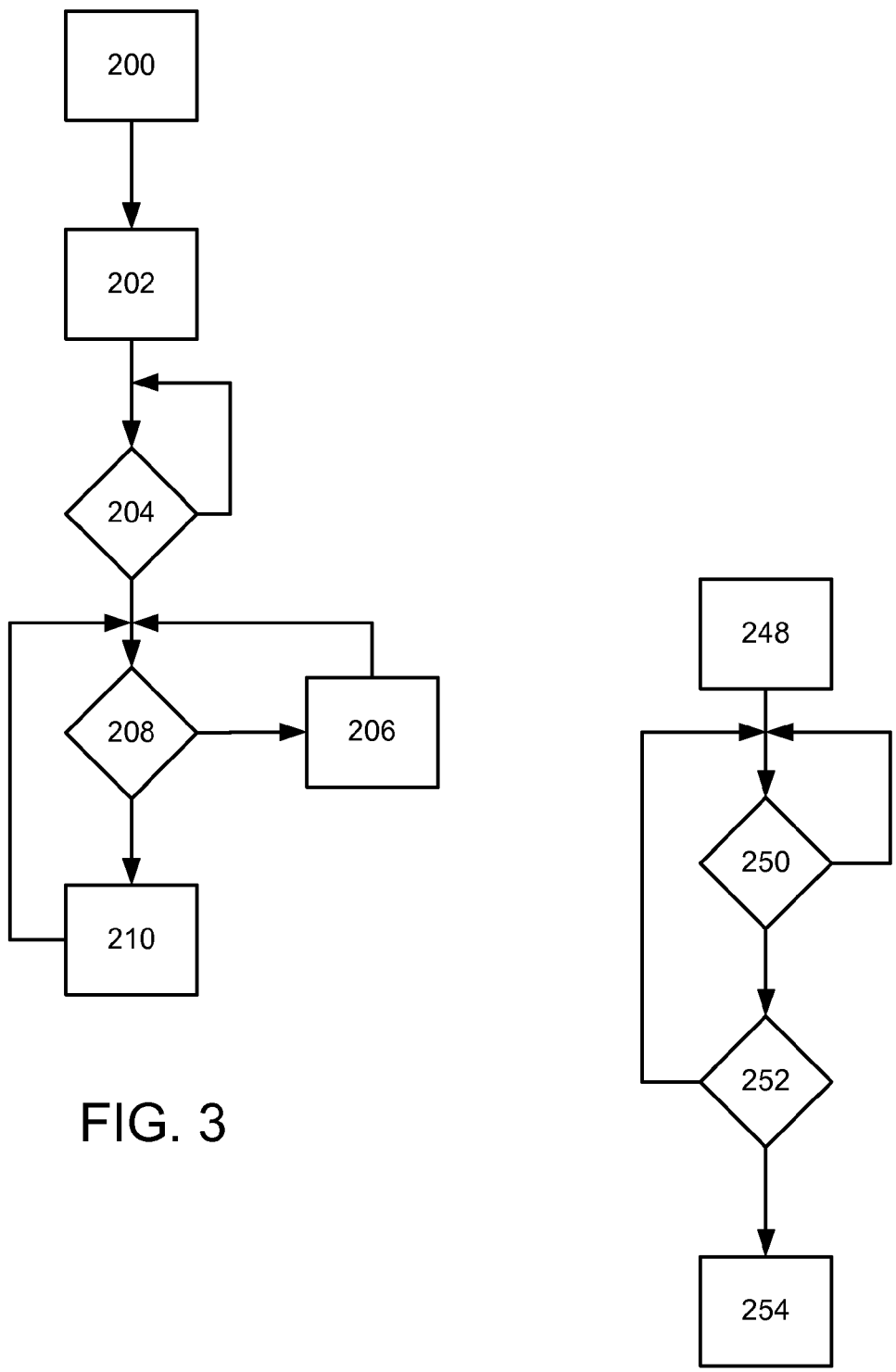
FIG. 3 is a flow chart illustrating a method for operating the HVAC system to reduce energy used by the HVAC system.
FIG. 4 is a flow chart illustrating the addition of destination locations where HVAC energy reduction may be employed.

FIG. 3 will now be discussed with reference to FIGS. 1 and 2. After the vehicle 20 and HVAC system 32 are started, block 200, a trip odometer is started, block 202. Alternatively, a timer may be started for block 202. A determination is made whether the trip odometer has passed an enable distance, block 204. Alternatively, a determination is made whether the timer has passed an enable time, block 204. This distance or time may be predetermined based on a distance or time that is needed to heat or cool the vehicle interior. This predetermined distance or time may also be increased or decreased based on ambient conditions around the vehicle 20, with very high or very low temperatures increasing the predetermined time/distance.

If the vehicle has not passed the enable distance (or time), then the check is repeated. If it has, then a determination is made whether the vehicle 20 is within a HVAC reduction region 110, block 208. If not, then the HVAC system continues with normal HVAC operation, block 206. If it is, then the control module 30 changes the HVAC system 32 into a power saving (or off) mode. Thus, with the vehicle 20 within a predetermined distance/time of a possible stopping site, the energy used for HVAC operation is reduced. The operation then checks again to determine if the vehicle 20 is still within one of the HVAC reduction regions, block 208. If it is not still in one of the regions 110, then normal HVAC operation is resumed, block 206.

FIG. 4, which will now be discussed with reference to FIGS. 1 and 2, illustrates a method for learning destinations 102, 104, 106 that may be added to a destination list, creating new (or replacing old) HVAC reduction regions 110. When the vehicle 20 is started, block 248, a determination is made as to whether the vehicle has been stationary sufficiently long to be considered a parking location 104, block 250. This determination may also take into account if the vehicle 20 was charged at this location. Alternatively, there may be no minimum amount of time and the location may be considered a parking location 104 if, for example, the vehicle is turned off, the driver's door is opened, or the driver's seat is unoccupied.

If not, then the location is not added to the destination list. If it is stationary for at least a predetermined time or meets other criteria sufficient to be considered a parking location 104 (or is a charging location 102), then a determination is made whether this location is currently on the destination list, block 252. If it is, then no addition is needed. Alternatively, this location may be moved up the list to show that it was a recent HVAC reduction location so that it does not drop from the destination list as new locations are added. If the location is not on the destination list, then it is added to the list, block 254. A HVAC reduction region 110 is then added around this new destination location.

For block 250, the determination may also include other criteria for determining when a parking location 104 should be added to the destination list. For example, the particular location may be added to the list only after the vehicle 20 has been parked at this location two or more times. There may also be a general error factor, so that the vehicle does not have to be parked in exactly the same parking space to be considered the same parking location 104. For example, different parking spaces in a mall parking lot. Other criteria can be set for determining when a particular site should be added to the destination list, which determines where HVAC reduction regions 110 will be located. Of course these learned locations may be in addition to locations programmed onto the destination list by the vehicle operator.

As an alternative, for sites on the destination list, the route taken to get to the destination and the time of day and day of week the vehicle went to that particular site may be tracked as well. The probability of going to a particular destination on the list may be calculated based on not only the distance to that particular site but also on the route taken, time of day and day of the week. If the probability of going to a particular site on the destination list is below a predetermined threshold, then, even though the vehicle enters the HVAC reduction region for that site, the control module may not switch the HVAC system to a power reduction mode.

While certain embodiments of the present invention have been described in detail, those familiar with the art to which this invention relates will recognize various alternative designs and embodiments for practicing the invention as defined by the following claims.

What is claimed is:

1. A method of increasing a range of a vehicle by decreasing trapped HVAC energy at an end of a trip, the method comprising the steps of:
    (a) determining and storing a destination list based on locations where the vehicle may be parked in the future, the destination list accessible by a control module in the vehicle;
    (b) determining HVAC reduction regions around each of the locations on the destination list, the HVAC reduction regions accessible by the control module;
    (c) operating a HVAC system while the vehicle is moving;
    (d) tracking the location of the vehicle relative to the locations on the destination list; and
    (e) the control module automatically reducing the energy usage of the HVAC system when the vehicle enters one of the HVAC reduction regions, wherein step (e) is further defined by the vehicle not reducing the energy usage of the HVAC system due to the vehicle entering one of the HVAC reduction regions unless the vehicle has traveled for a predetermined minimum amount of time since the most recent vehicle startup.

2. The method of claim 1 wherein step (e) is further defined by, when air conditioning is operating, the reduction in energy usage including stopping operation of a refrigerant compressor.

3. The method of claim 1 wherein step (e) is further defined by, when an electric heater is operating, the reduction in energy usage including stopping electricity to the electric heater.

4. The method of claim 1 wherein step (a) is further defined by at least one of the locations on the destination list being a location entered onto the destination list by a vehicle user.

5. The method of claim 4 wherein step (a) is further defined by at least one of the locations on the destination list being a learned location that is based on a previous location where the vehicle was parked.

6. The method of claim 1 wherein step (a) is further defined by at least one of the locations on the destination list being a learned location that is based on a previous location where the vehicle was parked.

7. The method of claim 1 wherein the vehicle uses an electric motor for vehicle propulsion and step (a) is further defined by at least one of the locations on the destination list being a learned location that is based on a previous location where a vehicle battery was charged.

8. The method of claim 1 wherein step (c) is further defined by at least one of the locations on the destination list being a learned location that is based on a previous location where the vehicle was parked and the vehicle was off for a time period greater than a predetermined minimum amount of time.

9. A method of increasing a range of a vehicle by decreasing trapped HVAC energy at an end of a trip, the method comprising the steps of:
   (a) determining and storing a destination list based on locations where the vehicle may be parked in the future, the destination list accessible by a control module in the vehicle;
   (b) determining HVAC reduction regions around each of the locations on the destination list, the HVAC reduction regions accessible by the control module, wherein step (b) is further defined by a size of the HVAC reduction regions being based at least in part on a difference between a sensed temperature in a passenger compartment of the vehicle and a desired temperature setting for the passenger compartment;
   (c) operating a HVAC system while the vehicle is moving;
   (d) tracking the location of the vehicle relative to the locations on the destination list; and
   (e) the control module automatically reducing the energy usage of the HVAC system when the vehicle enters one of the HVAC reduction regions.

10. The method of claim 1 wherein step (b) is further defined by a size of the HVAC reduction regions being based at least in part on an ambient temperature measured around the vehicle.

11. The method of claim 1 wherein step (b) is further defined by a size of the HVAC reduction regions being based at least in part on a measured sun load on the vehicle.

12. The method of claim 1 wherein step (b) is further defined by a size of the HVAC reduction regions being based at least in part on a difference between a sensed temperature in a passenger compartment of the vehicle and a desired temperature setting for the passenger compartment.

13. The method of claim 1 wherein step (a) is further defined by the locations on the destination list including information regarding at least one of a route the vehicle took to arrive at the particular location, the time of day the vehicle arrived at the particular location, and the day of the week the vehicle arrived at the particular location; step (f) further includes calculating a probability of going to the particular location on the destination list based on at least one of the route the vehicle is traveling, the time of day and the day of the week; and step (e) is further defined by automatically reducing the energy usage of the HVAC system when the vehicle enters the HVAC reduction region corresponding to the particular location only when the calculated probability of going to the particular location is above a predetermined probability.

14. The method of claim 1 wherein step (b) is further defined by a size of each of the HVAC reduction regions being based on a distance from the corresponding location.

15. The method of claim 1 wherein step (b) is further defined by a size of each of the HVAC reduction regions being based on an estimated travel time to the corresponding location.

16. The method of claim 1 wherein step (a) is further defined by at least one of the locations on the destination list being a learned location that is based on a previous location where the vehicle was parked more than one time.

17. A method of increasing a range of a vehicle by decreasing trapped HVAC energy at an end of a trip, the method comprising the steps of:
   (a) determining and storing a destination list based on locations where the vehicle may be parked in the future, the destination list accessible by a control module in the vehicle;
   (b) determining HVAC reduction regions around each of the locations on the destination list, the HVAC reduction regions accessible by the control module, wherein step (b) is further defined by a size of the HVAC reduction regions being based at least in part on an ambient temperature measured around the vehicle;
   (c) operating a HVAC system while the vehicle is moving;
   (d) tracking the location of the vehicle relative to the locations on the destination list; and
   (e) the control module automatically reducing the energy usage of the HVAC system when the vehicle enters one of the HVAC reduction regions.

18. The method of claim 9 wherein step (a) is further defined by at least one of the locations on the destination list being a location entered onto the destination list by a vehicle user, at least one of the locations on the destination list being a learned location that is based on a previous location where the vehicle was parked, and if the destination list reaches a maximum acceptable number of locations and a new learned parking location is determined, then the oldest learned parking location on the destination list is removed from the destination list.

19. A method of increasing a range of a vehicle by decreasing trapped HVAC energy at an end of a trip, the method comprising the steps of:
   (a) determining and storing a destination list based on locations where the vehicle may be parked in the future, the destination list accessible by a control module in the vehicle, wherein step (a) is further defined by the locations on the destination list including information regarding at least one of a route the vehicle took to arrive at the particular location, the time of day the vehicle arrived at the particular location, and the day of the week the vehicle arrived at the particular location; step (f) further includes calculating a probability of going to the particular location on the destination list based on at least one of the route the vehicle is traveling, the time of day and the day of the week; and step (e) is further defined by automatically reducing the energy usage of the HVAC system when the vehicle enters the HVAC reduction region corresponding to the particular location only when the calculated probability of going to the particular location is above a predetermined probability;
(b) determining HVAC reduction regions around each of the locations on the destination list, the HVAC reduction regions accessible by the control module;
(c) operating a HVAC system while the vehicle is moving;
(d) tracking the location of the vehicle relative to the locations on the destination list; and
(e) the control module automatically reducing the energy usage of the HVAC system when the vehicle enters one of the HVAC reduction regions.

20. A method of increasing a range of a vehicle by decreasing trapped HVAC energy at an end of a trip, the method comprising the steps of:
(a) determining and storing a destination list based on locations where the vehicle may be parked in the future, the destination list accessible by a control module in the vehicle;
(b) determining HVAC reduction regions around each of the locations on the destination list, the HVAC reduction regions accessible by the control module, wherein step (b) is further defined by a size of each of the HVAC reduction regions being based on an estimated travel time to the corresponding location;
(c) operating a HVAC system while the vehicle is moving;
(d) tracking the location of the vehicle relative to the locations on the destination list; and
(e) the control module automatically reducing the energy usage of the HVAC system when the vehicle enters one of the HVAC reduction regions.

21. The method of claim 17 wherein step (e) is further defined by the vehicle not reducing the energy usage of the HVAC system due to the vehicle entering one of the HVAC reduction regions unless the vehicle has traveled a predetermined minimum distance since the most recent vehicle startup.

* * * * *